(12) United States Patent
Palanki et al.

(10) Patent No.: US 8,817,702 B2
(45) Date of Patent: Aug. 26, 2014

(54) MITIGATION OF INTERFERENCE DUE TO PEER-TO-PEER COMMUNICATION

(75) Inventors: Ravi Palanki, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 12/839,144

(22) Filed: Jul. 19, 2010

(65) Prior Publication Data
US 2011/0170431 A1   Jul. 14, 2011

Related U.S. Application Data (60) Provisional application No. 61/227,608, filed on Jul. 22, 2009.

(51) Int. Cl.
| | | |
|---|---|---|
| H04W 4/00 | (2009.01) | |
| H04W 52/38 | (2009.01) | |
| H04B 7/00 | (2006.01) | |
| H04W 52/24 | (2009.01) | |
| H04B 17/00 | (2006.01) | |

(52) U.S. Cl.
CPC .......... *H04W 52/245* (2013.01); *H04W 52/242* (2013.01); *H04B 17/0052* (2013.01); *H04W 52/383* (2013.01)
USPC .......................................... 370/328; 455/522

(58) Field of Classification Search
CPC .............. H04W 52/146; H04W 54/24–54/248
See application file for complete search history.

(56) References Cited

U.S. PATENT DOCUMENTS

| | | | |
|---|---|---|---|
| 6,366,572 B1 * | 4/2002 | Esterberg et al. | 370/343 |
| 8,140,003 B2 | 3/2012 | Laroia et al. | |
| 2007/0211680 A1 | 9/2007 | Laroia et al. | |
| 2008/0069033 A1 * | 3/2008 | Li et al. | 370/328 |
| 2008/0069039 A1 | 3/2008 | Li et al. | |
| 2009/0011770 A1 * | 1/2009 | Jung et al. | 455/452.1 |

(Continued)

FOREIGN PATENT DOCUMENTS

| | | |
|---|---|---|
| EP | 2012441 A1 | 1/2009 |
| EP | 2012443 A2 | 1/2009 |

(Continued)

OTHER PUBLICATIONS

International Search Report—PCT/US2010/042966—International Search Authority, European Patent Office, Feb. 11, 2011.

(Continued)

*Primary Examiner* — Clemence Han
(74) *Attorney, Agent, or Firm* — James K. O'Hare (57) ABSTRACT

Techniques for mitigating interference due to peer-to-peer (P2P) communication are described. In an aspect, a P2P UE may measure the signal strength of downlink signals from base stations and may set its transmit power based on (e.g., proportional to) the measured signal strength in order to mitigate interference to WWAN UEs communicating with base stations. In another aspect, the P2P UE may measure the signal strength of uplink signals from WWAN UEs and may set its transmit power based on (e.g., inversely proportional to) the measured signal strength in order to mitigate interference to the WWAN UEs. In one design, the P2P UE may measure the signal strength of an uplink signal from a WWAN UE, estimate the pathloss between the two UEs based on the measured signal strength, and determine its transmit power based on the estimated pathloss.

27 Claims, 5 Drawing Sheets

(56) References Cited

U.S. PATENT DOCUMENTS

| | | |
|---|---|---|
| 2009/0017844 A1 | 1/2009 | Li et al. |
| 2009/0088083 A1 | 4/2009 | Fujii et al. |
| 2010/0110999 A1 | 5/2010 | Li et al. |

FOREIGN PATENT DOCUMENTS

| | | |
|---|---|---|
| EP | 2043402 A2 | 4/2009 |
| JP | 2006520158 A | 8/2006 |
| JP | 2008187702 A | 8/2008 |
| JP | 2008288872 A | 11/2008 |
| KR | 20090073166 A | 7/2009 |
| RU | 2232484 C2 | 7/2004 |
| TW | I298982 B | 7/2008 |
| WO | 0008706 A2 | 2/2000 |
| WO | WO-2004077920 A2 | 9/2004 |
| WO | WO-2007082245 | 7/2007 |
| WO | 2008034044 A2 | 3/2008 |
| WO | WO2008034023 | 3/2008 |
| WO | WO2008076983 | 6/2008 |
| WO | WO-2009009385 A1 | 1/2009 |
| WO | WO-2010011732 | 1/2010 |
| WO | WO-2010053688 | 5/2010 |

OTHER PUBLICATIONS

Partial International Search Report—PCT/US2010/042966—International Search Authority, European Patent Office, Dec. 8, 2010.
Written Opinion—PCT/US2010/042966—ISA/EPO—Feb. 11, 2011.
Janis, P., et al., "Interference-aware resource allocation for device-to-device radio underlaying cellular networks", Vehicular Technology Conference, VTC Spring 2009. IEEE 69th, Apr. 2009, pp. 1-5.
Taiwan Search Report—TW099124202—TIPO—Oct. 24, 2013.

\* cited by examiner

MITIGATION OF INTERFERENCE DUE TO PEER-TO-PEER COMMUNICATION

The present application claims priority to provisional U.S. Application Ser. No. 61/227,608, entitled "ADJACENT CHANNEL PROTECTION BY P2P DEVICES," filed Jul. 22, 2009, assigned to the assignee hereof and incorporated herein by reference.

BACKGROUND

I. Field

The present disclosure relates generally to communication, and more specifically to techniques for mitigating interference in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such wireless networks include wireless wide area networks (WWANs) and wireless local area networks (WLANs).

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may also be able to communicate peer-to-peer (P2P) with another UE, without communicating with a base station in a wireless network. P2P communication may reduce the load on the wireless network for local communication. Furthermore, P2P communication between two UEs may enable a first UE to act as a relay for a second UE. This may allow the second UE to communicate with a wireless network even though the second UE may be outside of the normal coverage of the wireless network. However, P2P communication may cause interference to other UEs (or WWAN UEs) communicating with base stations in the wireless network. It may be desirable to mitigate interference due to P2P communication on the WWAN UEs.

SUMMARY

Techniques for mitigating interference due to P2P communication are described herein. A P2P UE may communicate peer-to-peer with another UE and may transmit a downlink signal on a particular carrier. This downlink signal may cause interference to WWAN UEs communicating with base stations on the same carrier or a different carrier.

In an aspect, the P2P UE may measure the signal strength of downlink signals from base stations on adjacent carriers and/or on its carrier. The P2P UE may set its transmit power based on (e.g., proportional to) the measured signal strength in order to mitigate interference to the WWAN UEs. If the measured signal strength is sufficiently strong, then the P2P UE may transmit at higher power since it may have less interference impact on the WWAN UEs. Conversely, if the measured signal strength is low, then the P2P UE may transmit at lower power in order to reduce interference to the WWAN UEs.

In another aspect, the P2P UE may measure the signal strength of uplink signals from WWAN UEs on adjacent carriers and/or on its carrier. The P2P UE may set its transmit power based on (e.g., inversely proportional to) the measured signal strength in order to mitigate interference to the WWAN UEs. In one design, the P2P UE may measure the signal strength of an uplink signal from a WWAN UE and may determine its transmit power based on the measured signal strength. In one design, the P2P UE may estimate the pathloss between the WWAN UE and the P2P UE based on the measured signal strength and a nominal/expected transmit power of the uplink signal. The P2P UE may then determine its transmit power based on the estimated pathloss and a target received power of the downlink signal from the P2P UE at the WWAN UE.

Various aspects and features of the disclosure are described in further detail below.

DETAILED DESCRIPTION

The techniques described herein may be used for various wireless communication networks such as WWANs, WLANs, etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement one or more standards in the IEEE 802.11 family of standards (which is also referred to as Wi-Fi), Hiperlan, etc. The techniques described herein may be used for the wireless networks and radio technologies mentioned above as well as other wireless networks and radio technologies. For clarity, much of the description below is for a WWAN.

Figure 1:
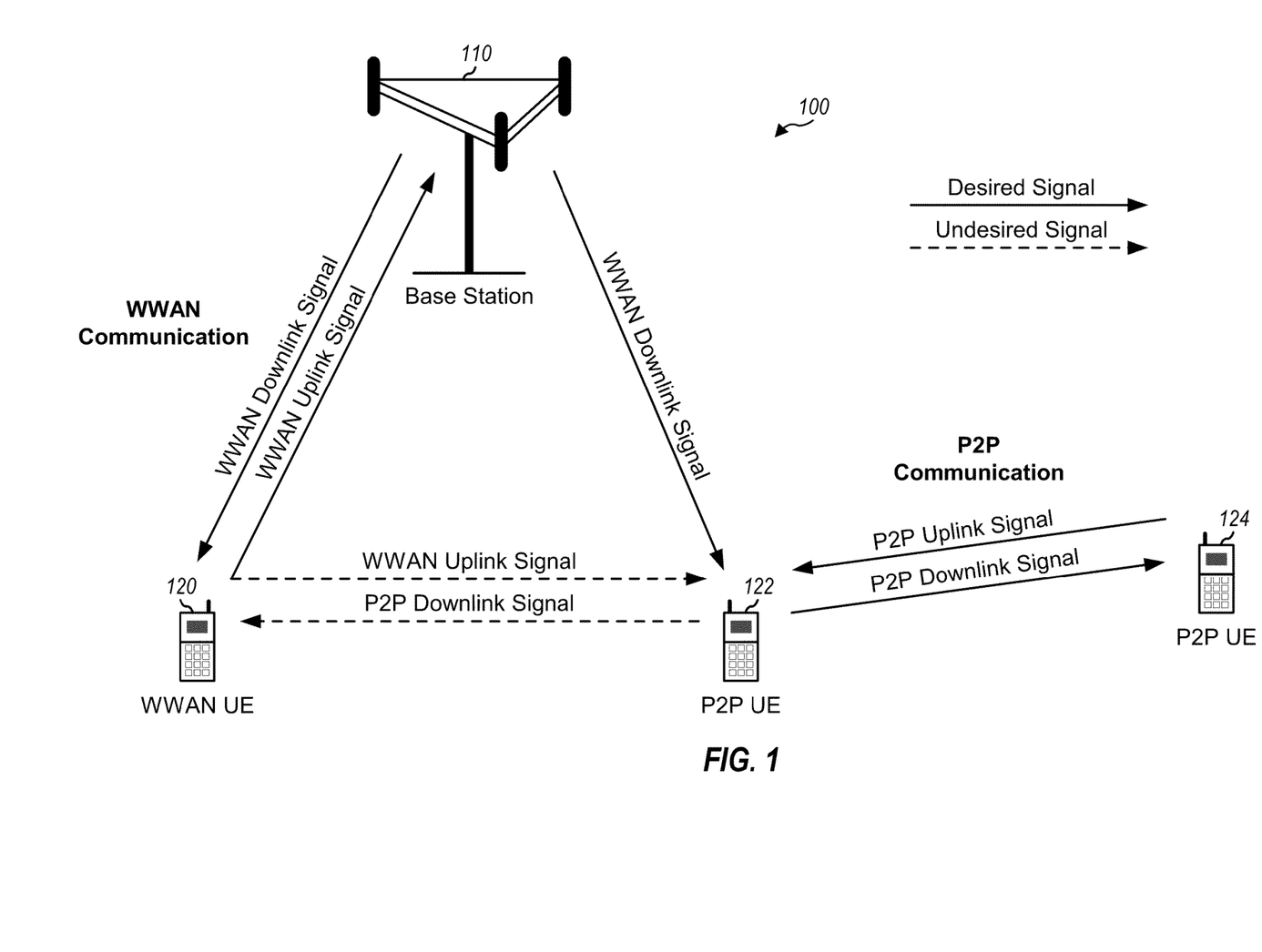
FIG. 1 shows a wireless communication network.

FIG. 1 shows a wireless communication network 100, which may be a WWAN. Wireless network 100 may include a number of base stations and other network entities that can support communication for a number of UEs. For simplicity, only one base station 110 and three UEs 120, 122 and 124 are shown in FIG. 1. Base station 110 may be an entity that communicates with the UEs and may also be referred to as a Node B, an evolved Node B (eNB), an access point, etc. Base station 110 may provide communication coverage for a particular geographic area and may support communication for the UEs located within the coverage area. The term "cell" can refer to a coverage area of base station 110 and/or a base station subsystem serving this coverage area.

UEs may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with a base station. Alternatively or additionally, the UE may communicate peer-to-peer with other UEs.

In the example shown in FIG. 1, UE 120 may communicate with base station 110 and may be referred to as a WWAN UE. For WWAN communication between UE 120 and base station 110, UE 120 may receive a WWAN downlink signal from base station 110 and may transmit a WWAN uplink signal to base station 110. UEs 122 and 124 may communicate peer-to-peer with one another and may be referred to as P2P UEs. For P2P communication between UEs 122 and 124, UE 122 may transmit a P2P downlink signal to peer UE 124 and may receive a P2P uplink signal from peer UE 124.

P2P communication may be supported in various manners. For example, P2P UEs may operate on a separate frequency spectrum that is not used by a wireless network. Alternatively, P2P UEs may utilize the frequency spectrum for the uplink of a wireless network because there may be a disadvantage to using the frequency spectrum for the downlink of the wireless network. A P2P UE communicating on the downlink spectrum may be close to a WWAN UE communicating with the wireless network. If the downlink spectrum is used, then the P2P UE may cause high interference to the WWAN UE on the downlink, which may then result in the WWAN UE being unable to receive the downlink signals from the wireless network.

Figures 2, 3:
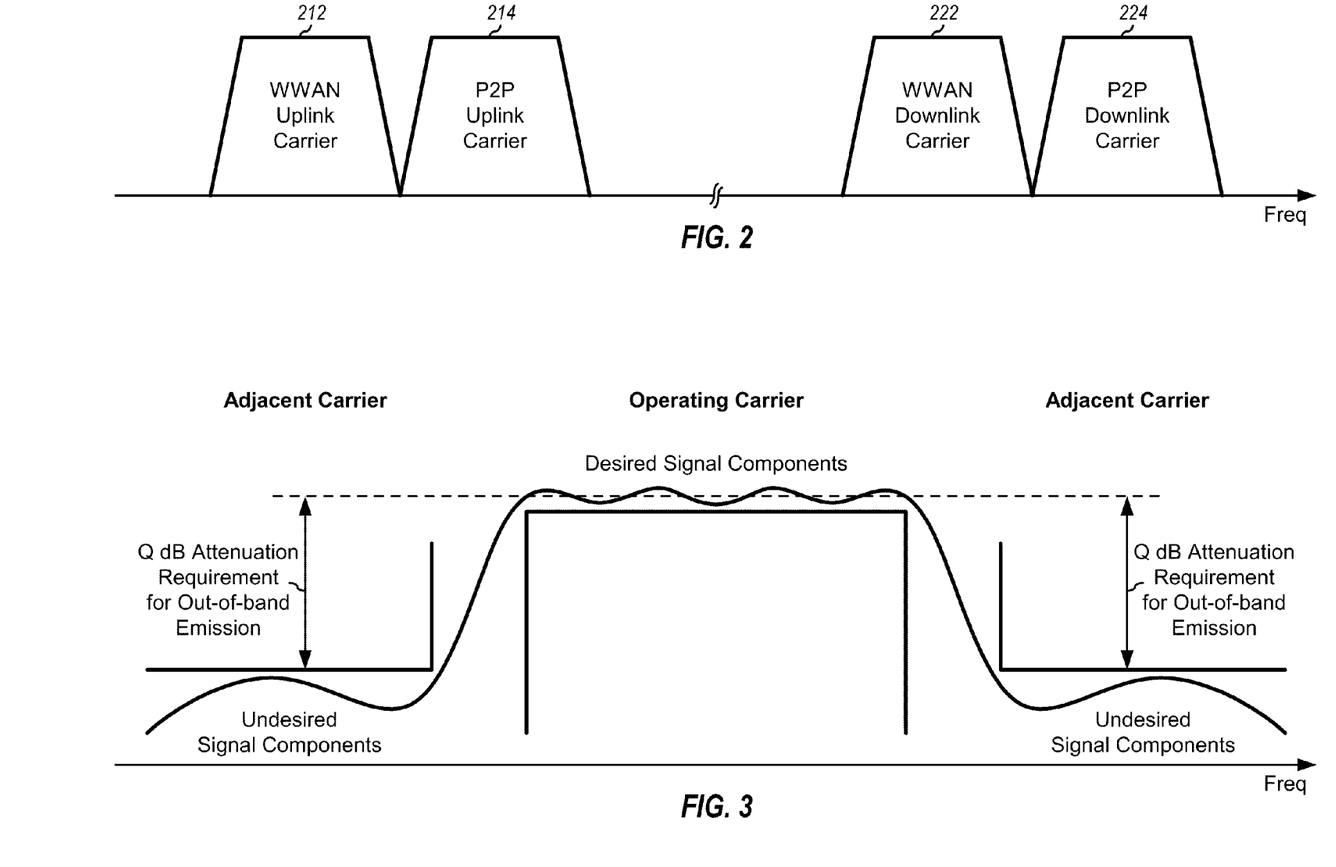
FIG. 2 shows WWAN and P2P communications on different carriers.
FIG. 3 shows exemplary spectral mask requirements for a UE.

FIG. 2 shows WWAN communication and P2P communication on separate but adjacent carriers. A number of carriers may be available for communication. Each carrier may be associated with a specific center frequency and a specific bandwidth. The carriers may be defined to be non-overlapping in frequency.

In the example shown in FIG. 2, a carrier 212 may be used for WWAN communication on the uplink of a wireless network and may be referred to as a WWAN uplink carrier. A carrier 222 may be used for WWAN communication on the downlink of the wireless network and may be referred to as a WWAN downlink carrier. A carrier 214 may be used for P2P communication on the uplink and may be referred to as a P2P uplink carrier. A carrier 224 may be used for P2P communication on the downlink and may be referred to as a P2P downlink carrier.

Ideally, WWAN communication should be free of interference from P2P communication, and vice versa. This may be achieved by using separate carriers for WWAN communication and P2P communication, e.g., as shown in FIG. 2. This assumes that (i) WWAN communication can be constrained to be completely within the WWAN downlink and uplink carriers and (ii) P2P communication can be constrained to be completely within the P2P downlink and uplink carriers. However, this assumption typically does not hold.

FIG. 3 shows exemplary spectral mask requirements for a UE. A spectral mask may specify a certain maximum amount of ripple within a passband and may require a certain minimum amount of attenuation in the stopband. A modulated signal transmitted by a UE may be required to conform to the spectral mask requirements. This modulated signal may include mostly desired signal components in the passband and would typically include undesired signal components in the stopband. The undesired signal components may be at least Q decibels (dB) below the desired signal components, where Q may be the required stopband attenuation.

The undesired signal components in the modulated signal from the UE may result from various phenomena such as local oscillator (LO) leakage, inphase/quadrature (I/Q) imbalance, and nonlinearity of a transmitter at the UE. For example, LO leakage may result in a leaked LO signal at the center frequency, and this leaked LO signal may mix with the desired signal components to generate undesired signal components. I/Q imbalance may result from gain error and/or phase error between the I and Q paths in the transmitter and may generate undesired signal components.

As shown in FIG. 3, a P2P UE may cause interference on an adjacent carrier due to out-of-band emissions from the P2P UE. This inter-carrier interference may degrade the performance of a WWAN UE communicating with a wireless network on the adjacent carrier. From the wireless network perspective, the inter-carrier interference may be more problematic than intra-carrier interference caused by P2P UEs to WWAN UEs. This is because a base station may be able to take corrective actions to mitigate intra-carrier interference on its own carrier, e.g., by partitioning the system bandwidth between the WWAN UEs and the P2P UEs. However, the base station may have little or no control on an adjacent carrier. Hence, mechanisms to minimize inter-carrier interference from P2P UEs to WWAN UEs on adjacent carrier may be highly desirable.

In an aspect, a P2P UE may detect for downlink signals from base stations on adjacent carriers and/or on its carrier and may measure the signal strength of each carrier on which downlink signals are detected. Signal strength may correspond to received power or received signal quality. The P2P UE may set its transmit power based on (e.g., proportional to) the measured signal strength. In particular, if the measured signal strength is sufficiently strong, then the P2P UE may transmit at higher power since it may have less interference impact on WWAN UEs communicating with the base stations. Conversely, if the measured signal strength is low, then the P2P UE may transmit at lower power in order to reduce interference to the WWAN UEs.

The P2P UE may detect for downlink signals from base stations in various manners. In one design, the P2P UE may include a WWAN receiver for the radio technology used by the base stations. The P2P UE may then search for suitable transmissions or signals from the base stations using the WWAN receiver. For example, the P2P UE may search for (i) synchronization signals transmitted by the base stations to support cell search and acquisition by the WWAN UEs, (ii) reference signals transmitted by the base stations to support channel estimation and channel quality measurements by the WWAN UEs, and/or (iii) other downlink transmissions. A reference signal is a signal that is known a priori by a transmitter and a receiver and may also be referred to as pilot. The P2P UE may search for a cell-specific reference signal (CRS)

transmitted by base stations in an LTE network, a common pilot channel (CPICH) transmitted by base stations in a WCDMA network, a pilot channel (PICH) transmitted by base stations in a CDMA 1X network, etc. The P2P UE may measure the signal strength of a detected signal (e.g., the CRS, CPICH, or PICH) on the carrier on which the signal is detected. Alternatively, the P2P UE may measure (i) the signal strength of other transmissions and/or signals on the carrier or (ii) the signal strength of the entire carrier.

In one design, the P2P UE may periodically detect for downlink signals from base stations and may measure the signal strength of each carrier on which a downlink signal is detected. The P2P UE may perform signal detection and measurement during measurement gaps, which may be gaps in communication for the P2P UE. The measurement gaps may be (i) periods of no communication defined by a radio technology to allow UEs to make measurements or (ii) periods in which the P2P UE is not communicating.

The P2P UE may determine its transmit power based on the measured signal strength on adjacent carriers and/or on its carrier in various manners. In one design, the P2P UE may determine its transmit power based on a function of the measured signal strength, as follows:

$$P_{TX} = f(P_{RX}) \quad \text{Eq (1)}$$

where $P_{RX}$ is the measured signal strength, $f(P_{RX})$ may be any suitable function, and $P_{TX}$ is the transmit power of the P2P UE. The function may be defined based on one or more other parameters besides measured signal strength. In the description herein, transmit power and received power are given in units of decibel relative to one milli-Watt (dBm), and pathloss and offsets are given in units of dB.

In one design, the P2P UE may determine its transmit power based on the measured signal strength, as follows:

$$P_{TX} = P_{RX} + \Delta_{OS}, \quad \text{Eq (2)}$$

where $\Delta_{OS}$ is an offset. The offset may be any suitable value that can provide good performance for the P2P UE and the WWAN UEs.

In another design, the P2P UE may compare the measured signal strength against different ranges of values, with each range being associated with a different transmit power for the P2P UE. The P2P UE may use the transmit power for the range within which the measured signal strength falls.

In general, the P2P UE may transmit at progressively higher transmit power for progressively higher measured signal strength. The transmit power of the P2P UE may or may not be a linear function of the measured signal strength. In one design, the P2P UE may select a transmit power that is lower than the maximum transmit power if measurement of signal strength on adjacent carriers and/or on its carrier is not successful. If a signal from a base station is not detected, then either a base station is not present or is present but too weak to be detected. The P2P UE may assume the latter and may restrict its transmit power to an upper bound in order to reduce impact to the operation of the base station.

In another aspect, a P2P UE may measure the signal strength of uplink signals from WWAN UEs on adjacent carriers and/or on its carrier. The P2P UE may set its transmit power based on (e.g., inversely proportional to) the measured signal strength in order to reduce interference to the WWAN UEs. The operation of the P2P UE may be more clearly described with the following example.

Figure 4:
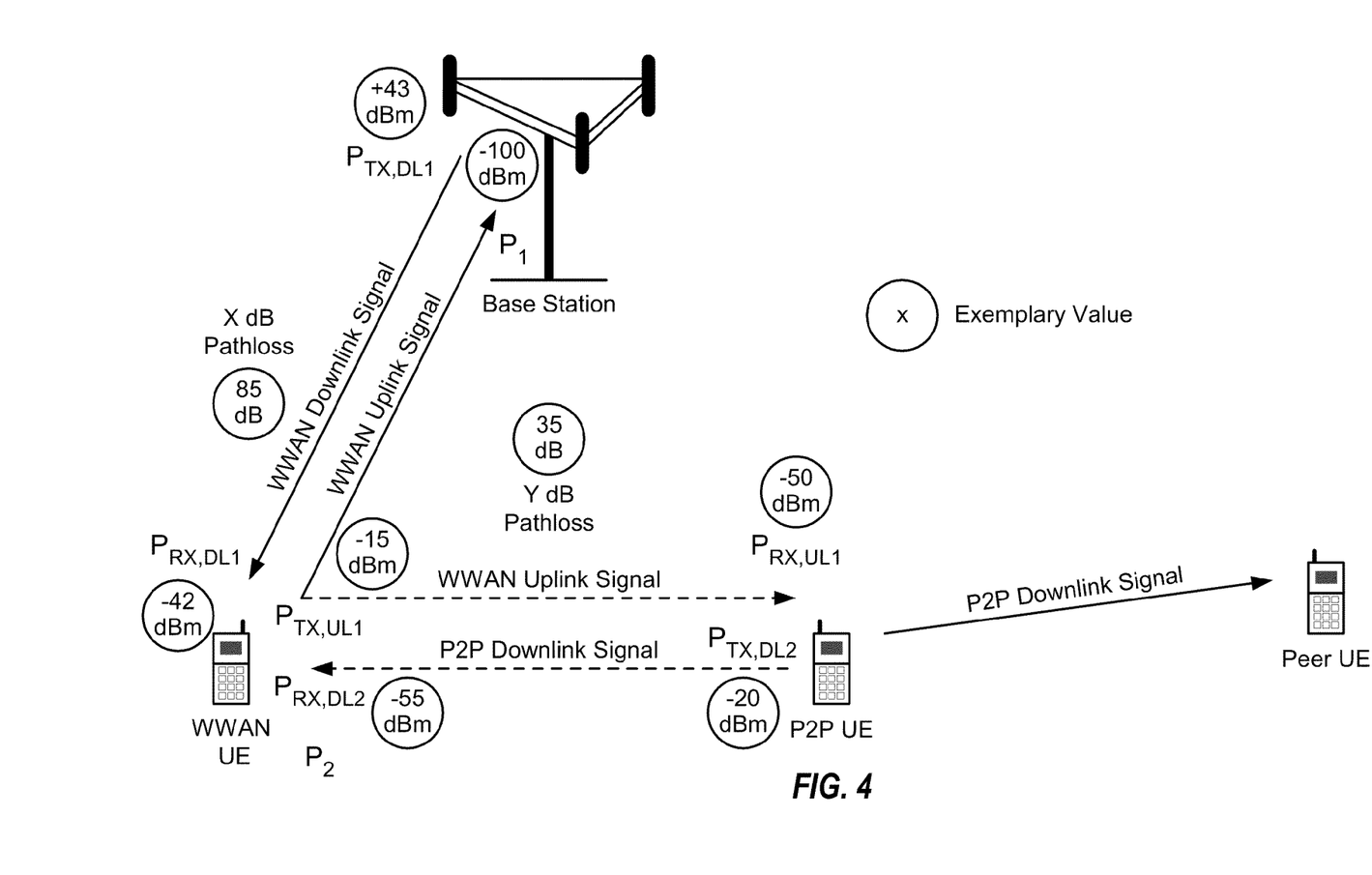
FIG. 4 shows operation of a P2P UE to mitigate interference to a WWAN UE.

FIG. 4 shows operation of a P2P UE to mitigate interference to a WWAN UE. In the example shown in FIG. 4, the WWAN UE may communicate with a base station in a wireless network. The P2P UE may communicate peer-to-peer with another UE, which may be referred to as the peer UE.

For WWAN communication, the WWAN UE may receive a WWAN downlink signal from the base station and may transmit a WWAN uplink signal to the base station. For P2P communication, the P2P UE may transmit a P2P downlink signal to the peer UE and may receive a P2P uplink signal from the peer UE. The P2P UE and the WWAN UE may be within close proximity of one another. The P2P UE may receive the WWAN uplink signal transmitted by the WWAN UE to the base station. Correspondingly, the WWAN UE may receive the P2P downlink signal transmitted by the P2P UE to the peer UE. At the WWAN UE, the P2P downlink signal from the P2P UE may act as interference to the WWAN downlink signal from the base station and may degrade the performance of the WWAN UE.

The base station may transmit the WWAN downlink signal at a transmit power of $P_{TX,DL1}$. The WWAN UE may receive the WWAN downlink signal at a received power of $P_{RX,DL1} = P_{TX,DL1} - X$, where X is the pathloss from the base station to the WWAN UE. The WWAN UE may estimate the pathloss based on the known transmit power and the measured received power of the WWAN downlink signal. The WWAN UE may transmit the WWAN uplink signal at a transmit power of $P_{TX,UL1}$, which may be expressed as:

$$P_{TX,UL1} = P_1 + X, \quad \text{Eq (3)}$$

where $P_1$ is a target received power of the WWAN uplink signal at the base station.

The P2P UE may receive the WWAN uplink signal at a received power of $P_{RX,UL1} = P_{TX,UL1} - Y$, where Y is the pathloss from the WWAN UE to the P2P UE. The P2P UE may not know the transmit power of the WWAN uplink signal and may estimate a "corrected" pathloss by assuming a nominal/expected transmit power for the WWAN uplink signal, as follows:

$$\begin{aligned} Z &= P_{TX,UL1,NOM} - P_{RX,UL1} \\ &= P_{TX,UL1,NOM} - (P_{TX,UL1} - Y), \end{aligned} \quad \text{Eq (4)}$$

where $P_{TX,UL1,NOM}$ is the nominal transmit power of the WWAN uplink signal, and Z is the corrected pathloss.

The P2P UE may transmit the P2P downlink signal at a transmit power of $P_{TX,UL2}$, which may be expressed as:

$$\begin{aligned} P_{TX,DL2} &= P_2 + Z \\ &= P_2 + P_{TX,UL1,NOM} - (P_{TX,UL1} - Y), \end{aligned} \quad \text{Eq (5)}$$

where $P_2$ is a target received power of the P2P downlink signal at the WWAN UE.

The WWAN UE may receive the P2P downlink signal at a received power of $P_{RX,DL2}$, which may be expressed as:

$$\begin{aligned} P_{RX,DL2} &= P_{TX,DL2} - Y \\ &= P_2 + Z - Y \\ &= P_2 + P_{TX,UL1,NOM} - P_1 - X. \end{aligned} \quad \text{Eq (6)}$$

A signal-to-noise-and-interference ratio (SINR) of the WWAN downlink signal at the WWAN UE may be expressed as:

$$SINR = P_{RX,DL1} - P_{RX,DL2} \quad \text{Eq (7)}$$
$$= (P_{TX,DL1} - X) - (P_2 + P_{TX,UL1,NOM} - P_1 - X)$$
$$= (P_{TX,DL1} - P_{TX,UL1,NOM}) + P_1 - P_2.$$

Equation (7) assumes that the pathloss from the WWAN UE to the P2P UE is approximately equal to the pathloss from the P2P UE to the WWAN UE. Equation (7) also assumes that all or most of the interference observed by the WWAN UE comes from the P2P downlink signal from the P2P UE.

As an example, the transmit power, the received power, and the pathloss of various signals in FIG. 4 may have the following values:

For the WWAN downlink and uplink:

| | | |
|---|---|---|
| $P_{TX,DL1}$ = +43 dBm, | $P_{RX,DL1}$ = −42 dBm, | X = 85 dB, |
| $P_{TX,UL1}$ = −15 dBm, | $P_1$ = −100 dBm, | |

For the links between the WWAN UE and the P2P UE:

| | | |
|---|---|---|
| $P_{TX,UL1}$ = −15 dBm, | $P_{RX,UL1}$ = −50 dBm, | Y = 35 dB, |
| $P_{TX,UL1,NOM}$ = −10 dBm, | $P_2$ = −60 dBm, | Z = 40 dB, |
| $P_{TX,DL2}$ = −20 dBm, | $P_{RX,DL2}$ = −55 dBm. | |

For the example given above, the base station may transmit the WWAN downlink signal at a transmit power of +43 dBm. The WWAN UE may receive the WWAN downlink signal at a received power of −42 dBm with a pathloss of 85 dB. The target received power of the WWAN uplink signal at the base station may be −100 dBm. The WWAN UE may transmit the WWAN uplink signal at a transmit power of −15 dBm due to the 85 dB pathloss. The pathloss from the WWAN UE to the P2P UE may be 35 dB, and the P2P UE may receive the WWAN uplink signal with a received power of −50 dBm. The nominal/expected transmit power of the WWAN uplink signal may be −10 dBm, and the corrected pathloss may be 40 dB. The target received power of the P2P downlink signal at the WWAN UE may be −60 dBm, and the P2P UE may transmit the P2P downlink signal at a power level of −20 dBm. The received power of the P2P downlink signal at the WWAN UE may be −55 dBm. The SINR of the WWAN downlink signal at the WWAN UE may be SINR=−42+55=13 dB.

As shown in equation (7), the WWAN UE may observe an SINR that may be independent of the locations of the WWAN UE and the P2P UE. In particular, the SINR is not dependent on the pathloss X of the WWAN links or the pathloss Y of the P2P links. A target SINR for the WWAN UE may be determined based on appropriate values for the parameters shown in the last line of equation (7). For example, $P_2$ may be selected to obtain the target SINR for the WWAN UE.

In the design show in equation (3), the WWAN UE may perform pathloss inversion and may set its transmit power proportional to the pathloss between the WWAN UE and the base station. In a second design, power control may be used to adjust the transmit power of the WWAN UE. In this design, the transmit power of the WWAN uplink signal from the WWAN UE may be expressed as:

$$P_{TX,UL1} = P_1 + g(X), \quad \text{Eq (8)}$$

where g(X) may be any suitable function of pathloss.

For the second design, the P2P UE may set its transmit power for its P2P downlink signal as described above for FIG. 4. The SINR of the WWAN UE may then be expressed as:

$$SINR = (P_{TX,DL1} - P_{TX,UL1,NOM}) + P_1 - P_2 - X + g(X). \quad \text{Eq (9)}$$

For the second design, the SINR of the WWAN UE may be dependent on the pathloss X between the WWAN UE and the base station, which may in turn be dependent on the location of the WWAN UE. A conservative estimate of the minimum possible value of g(X)−X may be used, and $P_2$ may be selected to account for g(X)−X and to achieve the target SINR for the WWAN UE. $P_2$ may also be selected to compensate for link imbalance between the downlink and uplink, calibration errors, etc.

For clarity, the description above assumes that the P2P UE transmits the P2P downlink signal on the same carrier used by the base station to transmit the WWAN downlink signal. If the P2P UE and the base station transmit on adjacent carriers, then the transmit power of the P2P downlink signal may be determined as follows:

$$P_{TX,DL2} = P_2 + Z + \delta_{OS} \quad \text{Eq (10)}$$
$$= P_2 + P_{TX,UL1,NOM} - (P_{TX,UL1} - Y) + \delta_{OS},$$

where $\delta_{OS}$ is an offset or adjustment. The offset $\delta_{OS}$ may be dependent on the stopband attenuation requirements for the P2P UE. For example, if the stopband attenuation is 30 dB, then the offset may be equal to 30 dB. The transmit power of the P2P UE may then be increased by 30 dB due to operation on an adjacent carrier instead of on the same carrier as the base station.

In one design, the P2P UE may autonomously measure the received power of the WWAN uplink signal from the WWAN UE and may adjust its transmit power for the P2P downlink signal based on the received power of the WWAN uplink signal to mitigate interference to the WWAN UE. The P2P UE may be provided with the values of pertinent parameters to compute its transmit power, e.g., as shown in equation (5) or (10). The WWAN UE and the base station may not need to be aware of the presence of the P2P UE. In another design, the P2P UE may autonomously measure the total received power on the uplink. This design may be used, e.g., when the P2P UE does not have information about the WWAN UE and is unable to measure the received power of the WWAN UE.

In another design, the P2P UE may be provided with information that may be used to improve interference mitigation to the WWAN UE. For example, the P2P UE may be provided with information for one or more of the following:

Transmit power used by the WWAN UE, which may replace the nominal transmit power $P_{TX,UL1,NOM}$, and Sequences used by the WWAN UE, which may be used to search for the WWAN uplink signal from the WWAN UE.

In one design, the P2P UE may perform interference mitigation all the time for the WWAN UE. In another design, the P2P UE may perform interference mitigation whenever requested. For example, the WWAN UE may observe poor channel conditions on the WWAN downlink and may report this to the base station. The base station may then transmit information regarding the poor channel conditions observed by the WWAN UE. The P2P UE may receive the information from the base station and may perform interference mitigation in response to receiving the information.

Figure 5:
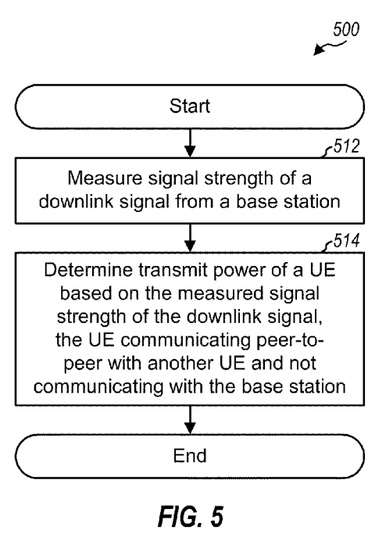
FIGS. 5 and 6 show a process and an apparatus, respectively, for mitigating interference due to P2P communication based on measurement of downlink signals.

FIG. 5 shows a design of a process 500 for mitigating interference due to peer-to-peer communication. Process 500 may be performed by a UE (as described below) or by some other entity. The UE may detect for a downlink signal from a base station based on at least one synchronization signal, or at least one reference signal, and/or some other transmission or signal transmitted by the base station. The UE may communicate peer-to-peer with another UE and may not be communicating with the base station. The UE may measure the signal strength (e.g., received power) of the downlink signal from the base station (block 512). The UE may determine its transmit power based on the measured signal strength of the downlink signal (block 514). In one design, the UE may determine its transmit power based on a function of the measured signal strength of the downlink signal, e.g., as shown in equation (1). In another design, the UE may determine its transmit power based on the measured signal strength of the downlink signal and an offset, e.g., as shown in equation (2).

The UE may receive the downlink signal from the base station on a first carrier. In one design, the UE may transmit on the first carrier and may determine its transmit power for this carrier. In another design, the UE may transmit on a second carrier that is different from (e.g., adjacent to) the first carrier and may determine its transmit power for the second carrier.

Figure 6:
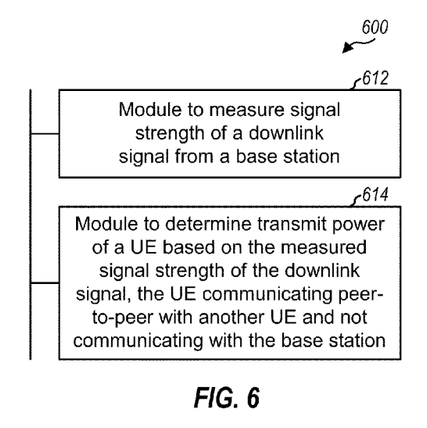

FIG. 6 shows a design of an apparatus 600 for mitigating interference due to peer-to-peer communication. Apparatus 600 includes a module 612 to measure signal strength of a downlink signal from a base station, and a module 614 to determine the transmit power of a UE based on the measured signal strength of the downlink signal. The UE may communicate peer-to-peer with another UE and may not be communicating with the base station.

Figure 7:
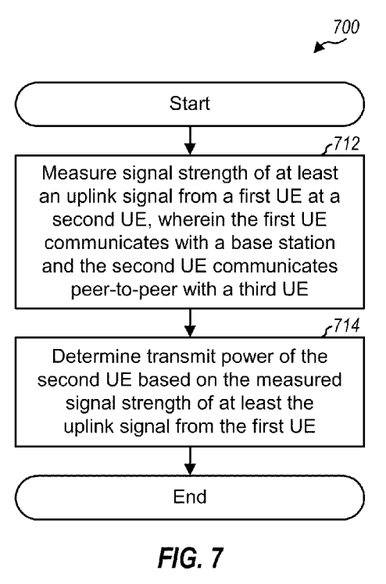
FIGS. 7 and 8 show a process and an apparatus, respectively, for mitigating interference due to P2P communication based on measurement of uplink signals.

FIG. 7 shows a design of a process 700 for mitigating interference to a first UE due to peer-to-peer communication by a second UE. The first UE may communicate with a base station, and the second UE may communicate peer-to-peer with a third UE. Process 700 may be performed by the second UE (as described below) or by some other entity. The second UE may measure the signal strength (e.g., received power) of at least an uplink signal from the first UE (block 712). In one design, the second UE may measure the signal strength of only the uplink signal from the first UE. In another design, the second UE may measure the total signal strength on the uplink, which would include the uplink signal from the first UE and possibly uplink signals from other UEs. In either case, the second UE may determine its transmit power based on the measured signal strength of at least the uplink signal from the first UE (block 714).

The first UE may receive a downlink signal on a first carrier from the base station. In one design, the second UE may transmit on the first carrier and may determine its transmit power for the first carrier based on the measured signal strength of at least the uplink signal from the first UE. In another design, the second UE may transmit on a second carrier that is different from (e.g., adjacent to) the first carrier and may determine its transmit power for the second carrier based on the measured signal strength of at least the uplink signal from the first UE.

In one design of block 714, the second UE may estimate the pathloss (e.g., Z) between the first UE and the second UE based on the measured signal strength (e.g., $P_{RX,UL1}$) of the uplink signal from the first UE. The pathloss may be estimated based further on a nominal/expected transmit power (e.g., $P_{TX,UL1,NOM}$) of the uplink signal from the first UE, e.g., as shown in equation (4). The second UE may then determine its transmit power based on the estimated pathloss and a target received power (e.g., $P_2$) of a downlink signal from the second UE at the first UE, e.g., as shown in equation (5). The second UE may also determine its transmit power based further on an offset (e.g., $\delta_{OS}$), which may be determined by an amount of attenuation of out-of-band emission from the second UE, e.g., as shown in equation (10).

The target received power of the downlink signal from the second UE may be selected to provide the desired performance for the first UE and to possibly account for other factors. In one design, the uplink signal from the first UE may be determined based on a function of pathloss between the first UE and a base station, e.g., as shown in equation (8). In this case, the target received power of the downlink signal from the second UE at the first UE may be determined based on the function of pathloss.

In one design, the second UE may perform interference mitigation all the time. In another design, the second UE may perform interference mitigation only when requested or directed. In this design, the second UE may receive information indicative of the first UE observing poor channel conditions. In response, the second UE may determine its transmit power based on the measured signal strength of the uplink signal from the first UE to mitigate interference to the first UE.

In one design, the second UE may perform interference mitigation autonomously based on information known to and/or collected by the second UE. In another design, the second UE may receive information related to the uplink signal transmitted by the first UE and may perform interference mitigation based on the received information. This information may be received from the first UE and/or the base station communicating with the first UE. The second UE may measure the signal strength of the uplink signal based on the received information, which may include information on sequences used by the first UE, etc. The second UE may also determine its transmit power based on the received information, which may include the transmit power of the first UE, etc.

Figure 8:
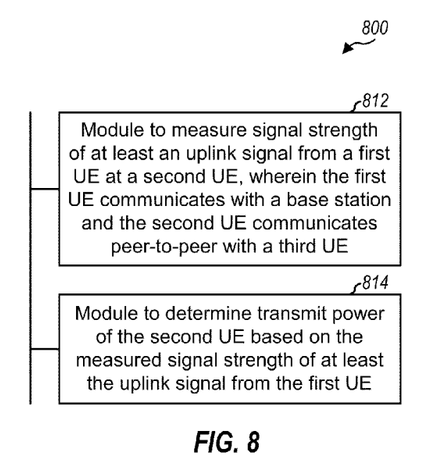

FIG. 8 shows a design of an apparatus 800 for mitigating interference to a first UE due to peer-to-peer communication by a second UE. Apparatus 800 may be for the second UE. Apparatus 800 includes a module 812 to measure signal strength of at least an uplink signal from the first UE at the second UE, wherein the first UE communicates with a base station and the second UE communicates peer-to-peer with a third UE, and a module 814 to determine the transmit power of the second UE based on the measured signal strength of at least the uplink signal from the first UE.

The modules in FIGS. 6 and 8 may comprise processors, electronic devices, hardware devices, electronic components, logical circuits, memories, software codes, firmware codes, etc., or any combination thereof.

Figure 9:
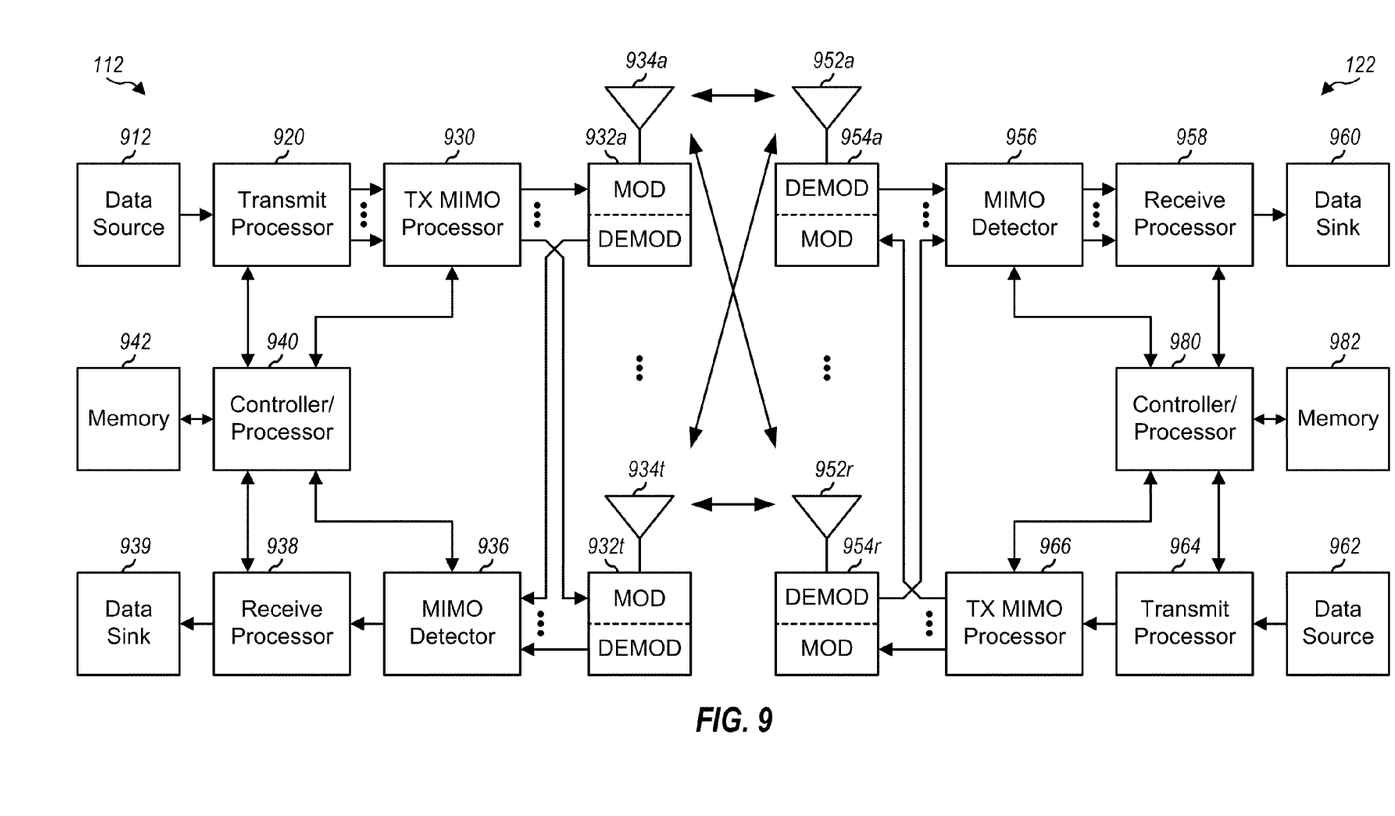
FIG. 9 shows a block diagram of a P2P UE and a station.

FIG. 9 shows a block diagram of a design of a station 112 and P2P UE 122. Station 112 may be base station 110 or UE 120 in FIG. 1. Station 112 may be equipped with T antennas 934a through 934t, and UE 122 may be equipped with R antennas 952a through 952r, where in general T≥1 and R≥1.

At station 112, a transmit processor 920 may receive data from a data source 912 and control information from a controller/processor 940. Processor 920 may process (e.g., encode and modulate) the data and control information to obtain data symbols and control symbols, respectively. Processor 920 may also generate reference symbols for one or more reference signals and/or one or more synchronization signals. A transmit (TX) multiple-input multiple-output (MIMO) processor 930 may perform spatial processing (e.g., precoding) on the data symbols, the control symbols, and/or the reference symbols, if applicable, and may provide T output symbol streams to T modulators (MODs) 932a through 932t. Each modulator 932 may process a respective output symbol stream (e.g., for OFDM, SC-FDMA, etc.) to obtain an output sample stream. Each modulator 932 may further process (e.g., convert to analog, amplify, filter, and upconvert)

the output sample stream to obtain a modulated signal. T modulated signals from modulators 932a through 932t may be transmitted via T antennas 934a through 934t, respectively.

At UE 122, antennas 952a through 952r may receive the modulated signals from station 112 and other stations (e.g., peer UE 124, other UEs, and/or base stations) and may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, SC-FDMA, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate and decode) the detected symbols, provide decoded data for UE 122 to a data sink 960, and provide decoded control information to a controller/processor 980.

At UE 122, a transmit processor 964 may receive data from a data source 962 and control information from controller/processor 980. Processor 964 may process (e.g., encode and modulate) the data and control information to obtain data symbols and control symbols, respectively. Processor 964 may also generate reference symbols for one or more reference signals and/or one or more synchronization signals. The symbols from transmit processor 964 may be precoded by a TX MIMO processor 966 if applicable, further processed by modulators 954a through 954r (e.g., for SC-FDM, OFDM, etc.), and transmitted to peer UE 124 and/or other stations. Station 112 may receive the modulated signals transmitted by UE 122.

At station 112, the modulated signals from UE 122 and other stations (e.g., other UEs and/or base stations) may be received by antennas 934, processed by demodulators 932, detected by a MIMO detector 936 if applicable, and further processed by a receive processor 938 to obtain decoded data and control information sent to station 112. Processor 938 may provide the decoded data to a data sink 939 and the decoded control information to controller/processor 940.

Controllers/processors 940 and 980 may direct the operation at station 112 and UE 122, respectively. Memories 942 and 982 may store data and program codes for station 112 and UE 122, respectively. Demodulators 954 and/or processor 980 may detect for signals from base stations and/or UEs and may measure the signal strength of the detected signals. Processor 980 may determine the transmit power of UE 122 based on the measured signal strength, as described above. Processor 980 and/or other processors and modules at UE 122 may perform or direct process 500 in FIG. 5, process 700 in FIG. 7, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
    measuring, at a user equipment (UE), a signal strength of a downlink signal from a base station;
    estimating a pathloss between the UE and the base station based on a known transmit power of the base station and the measured signal strength; and
    determining a transmit power of the UE based on the measured signal strength of the downlink signal and the pathloss, the UE communicating peer-to-peer with another UE and not communicating with the base station.

2. The method of claim 1, further comprising:
    detecting for the downlink signal from the base station based on at least one synchronization signal, or at least one reference signal, or both transmitted by the base station.

3. The method of claim 1, wherein the determining the transmit power of the UE comprises determining the transmit power of the UE based on a function of the measured signal strength of the downlink signal.

4. The method of claim 1, wherein the determining the transmit power of the UE comprises determining the transmit power of the UE based on the measured signal strength of the downlink signal and an offset.

5. The method of claim 1, further comprising:
    receiving the downlink signal from the base station on a first carrier, and wherein the transmit power of the UE is for a second carrier different from the first carrier.

6. The method of claim 1, further comprising:
    receiving the downlink signal from the base station on a first carrier, and wherein the transmit power of the UE is for the first carrier.

7. The method of claim 1, wherein the determining the transmit power of the UE comprises determining and setting the transmit power of the UE to mitigate interference between the UE and the another UE.

8. The method of claim 1, wherein the measuring the signal strength of the downlink signal from the base station comprises measuring the signal strength of the downlink signal from the base station during gaps in communication of the UE.

9. The method of claim 1, wherein the determining the transmit power of the UE based on the measured signal strength of the downlink signal and the pathloss comprises determining and setting the transmit power of the UE to be proportional to the pathloss.

10. An apparatus for wireless communication, comprising:
    means for measuring, at a user equipment (UE), a signal strength of a downlink signal from a base station; and
    means for estimating a pathloss between the UE and the base station based on a known transmit power of the base station and the measured signal strength; and
    means for determining a transmit power of the UE based on the measured signal strength of the downlink signal and the pathloss, the UE communicating peer-to-peer with another UE and not communicating with the base station.

11. The apparatus of claim 10, further comprising:
    means for detecting for the downlink signal from the base station based on at least one synchronization signal, or at least one reference signal, or both transmitted by the base station.

12. The apparatus of claim 10, wherein the means for determining the transmit power of the UE comprises means for determining the transmit power of the UE based on a function of the measured signal strength of the downlink signal.

13. The apparatus of claim 10, further comprising:
    means for receiving the downlink signal from the base station on a first carrier, and wherein the transmit power of the UE is for a second carrier different from the first carrier.

14. The apparatus of claim 10, wherein the means for determining the transmit power of the UE comprises means for determining and setting the transmit power of the UE to mitigate interference between the UE and the another UE.

15. The apparatus of claim 10, wherein the means for measuring the signal strength of the downlink signal from the base station comprises means for measuring the signal strength of the downlink signal from the base station during gaps in communication of the UE.

16. The apparatus of claim 10, wherein the means for determining the transmit power of the UE based on the measured signal strength of the downlink signal and the pathloss comprises means for determining and setting the transmit power of the UE to be proportional to the pathloss.

17. An apparatus for wireless communication, comprising:
    at least one processor configured to:
        measure, at a user equipment (UE), a signal strength of a downlink signal from a base station;
        estimate a pathloss between the UE and the base station based on a known transmit power of the base station and the measured signal strength; and
        determine a transmit power of the UE based on the measured signal strength of the downlink signal and the pathloss, the UE communicating peer-to-peer with another UE and not communicating with the base station.

18. The apparatus of claim 17, wherein the at least one processor is configured to detect for the downlink signal from the base station based on at least one synchronization signal, or at least one reference signal, or both transmitted by the base station.

19. The apparatus of claim 17, wherein the at least one processor is configured to determine the transmit power of the UE based on a function of the measured signal strength of the downlink signal.

20. The apparatus of claim 17, wherein the at least one processor is configured to receive the downlink signal from the base station on a first carrier, and to determine the transmit power of the UE for a second carrier different from the first carrier.

21. The apparatus of claim 17, wherein the at least one processor is configured to determine and set the transmit power of the UE to mitigate interference between the UE and the another UE.

22. The apparatus of claim 17, wherein the at least one processor is configured to measure the signal strength of the downlink signal from the base station during gaps in communication of the UE.

23. The apparatus of claim 17, wherein the at least one processor is configured to determine and set the transmit power of the UE to be proportional to the pathloss.

24. A computer program product, comprising:
a non-transitory computer-readable medium comprising:
code for causing at least one computer to measure, at a user equipment (UE), a signal strength of a downlink signal from a base station;
code for causing the at least one computer to estimate a pathloss between the UE and the base station based on a known transmit power of the base station and the measured signal strength; and
code for causing the at least one computer to determine a transmit power of the UE based on the measured signal strength of the downlink signal and the pathloss, the UE communicating peer-to-peer with another UE and not communicating with the base station.

25. The computer program product of claim 24, wherein the non-transitory computer-readable medium comprises code for causing the at least one computer to determine and set the transmit power of the UE to mitigate interference between the UE and the another UE.

26. The computer program product of claim 24, wherein the non-transitory computer-readable medium comprises code for causing the at least one computer to measure the signal strength of the downlink signal from the base station during gaps in communication of the UE.

27. The computer program product of claim 24, wherein the non-transitory computer-readable medium comprises code for causing the at least one computer to determine and set the transmit power of the UE to be proportional to the pathloss.

* * * * *